Feb. 6, 1968　　　F. P. NIELSEN ET AL　　　3,367,634
FENCE TENSIONING DEVICE

Filed Jan. 5, 1966　　　　　　　　　　　　2 Sheets-Sheet 1

Floyd P. Nielsen
Bernard O. Anderson
INVENTORS

Feb. 6, 1968  F. P. NIELSEN ET AL  3,367,634
FENCE TENSIONING DEVICE
Filed Jan. 5, 1966  2 Sheets-Sheet 2
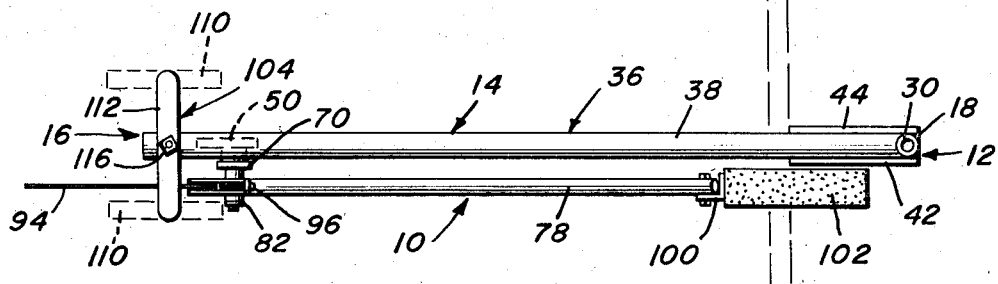
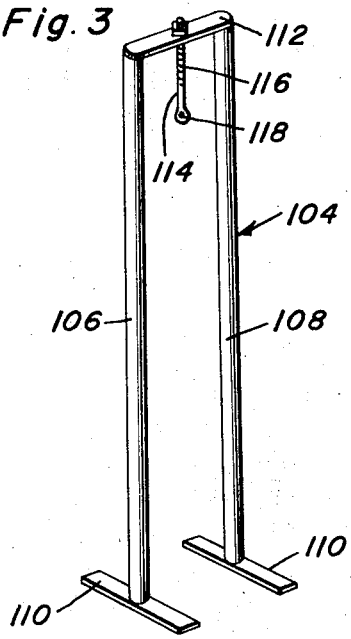
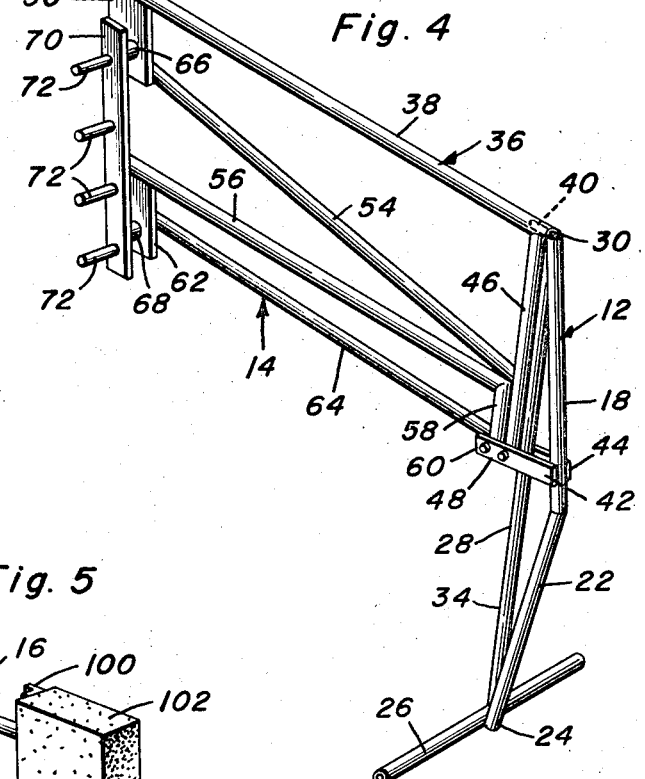
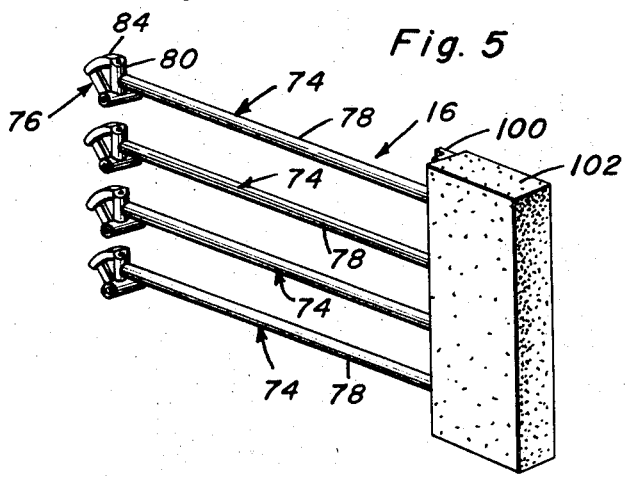
Floyd P. Nielsen
Bernard O. Anderson
INVENTORS

United States Patent Office 3,367,634
Patented Feb. 6, 1968

3,367,634
FENCE TENSIONING DEVICE
Floyd P. Nielsen, Rte. 3, Box 822, Glendale, Ariz. 85301, and Bernard O. Anderson, 6320 N. 30th Drive, Phoenix, Ariz. 85017
Filed Jan. 5, 1966, Ser. No. 518,960
5 Claims. (Cl. 256—38)

ABSTRACT OF THE DISCLOSURE

A tensioning and anchoring device for fence cables including an upstanding support anchored in the ground and a stress distributing assembly characterized by a plurality of strut members mounted at one end of the upstanding support. Interconnected plate members are attached to the opposite sides of the strut members. A number of pivot members are affixed to the interconnected plate members. An arcuate member is pivotally mounted upon each of the pivot members and the terminal end of a fence cable is affixed to the arcuate member. Each arcuate member is further connected to a lever bar, the opposite end of the lever bar being attached to a weighted block. Thus, an equal proportion of the moment produced by the weighted block is assumed by each arcuate member by means of the interconnecting lever bars and the weighted block maintains the tension in the fence cables regardless of expansion or contraction due to temperature variation.

---

This invention relates generally to a fence tensioning device and more specifically to a leverage-type tensioning device utilizing weight means for applying uniform tension to cables or other types of fence materials.

This invention includes important and novel features which are essential in cattle fencing and are missing in former fence structures. In cattle fencing, cables having a minimum breaking point of between six and ten thousand pounds are needed wherever cattle are crowded into close quarters, as the possibility of great pressure being put upon the fence cables exists. Barbed wire, which is usually used for cattle fencing is not desirable in this case because of the possiblity of injury to the cattle. Furthermore, the barbed wire does not have the strength needed for this purpose. Insofar as known to the inventors, prior to their instant invention, rail-type fencing which employed pipe or steel bars was used rather than cables for cattle fencing inasmuch as there was no practical and expedient way of maintaining a tight fence because of the forces of expansion and contraction which acted upon the cables. It had been proposed to retain cables or wires in tension for use in fencing by means of springs. However, the use of springs is not effective inasmuch as springs are adversely affected by exposure to the elements so as to be rendered practically useless and further, springs necessary to maintain the high tension needed for fencing cables would be prohibitive in cost. As will be obvious by referring to the specific description of the invention provided below, the instant invention provides means for maintaining uniform and constant tension on a plurality of fence cables by attaching each of the cables to its own independent tension lever, and all of the levers to a single or common weight means.

It is an object of the present invention to provide a fence tensioning unit for cable type fences in particular, which unit applies equal tension to each cable of the fence regardless of the ambient temperature or other extrinsic factors which adversely affect the tension of a cable.

It is another object of the present invention to provide a fence tensioning device including novel and unique means for anchoring the device to the ground as well as distributing the forces imparted to the fence post when the fence cables are stressed.

It is another object of the present invention to provide a fence tensioning unit for use with a cable type fence including lever supported weight means for maintaining equal tension on each of the cables as well as means for limiting upward movement of the weight means.

It is a further object of the present invention to provide a uniquely supported end section or post for use with either a cable type or other type fence which not only securely anchors the post into the ground, but also includes a plurality of force distributing members attached thereto for use when the fence is stressed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of the device corresponding to the illustration of FIGURE 1;

FIGURE 3 is a perspective view of a portion of the fence tensioning and anchoring device illustrated in FIGURES 1 and 2;

FIGURE 4 is a perspective view of another portion of the fence tensioning and anchoring device illustrated in FIGURES 1 and 2;

FIGURE 5 is a perspective view of still another portion or component part of the fence tensioning and anchoring device illustrated in FIGURES 1 and 2;

Figure 1:
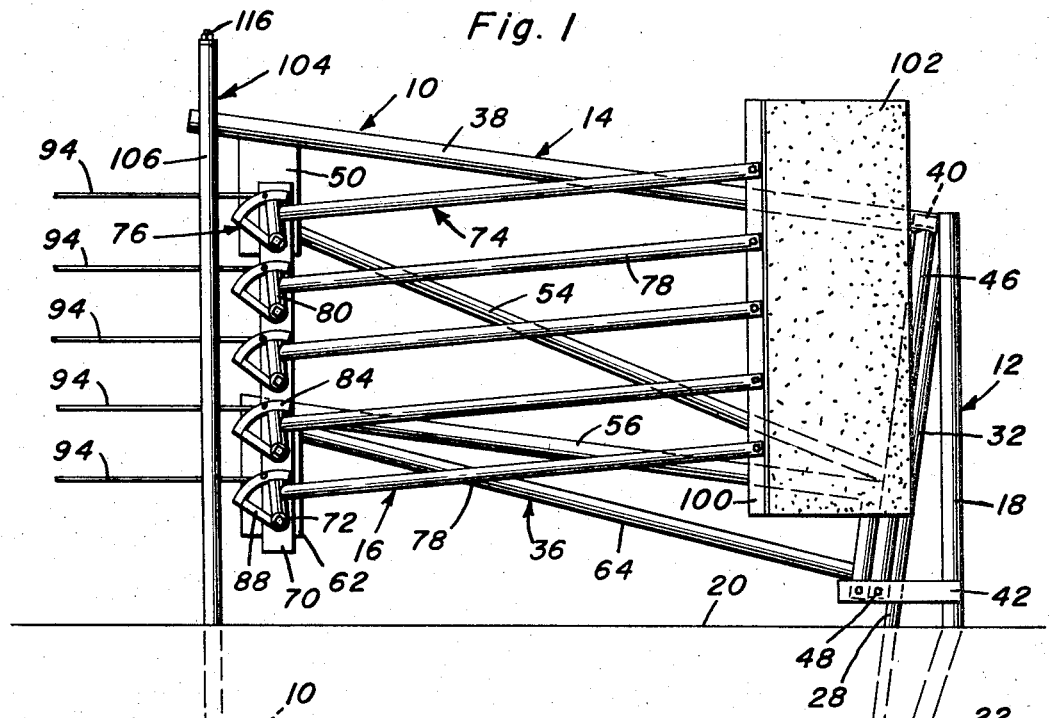
FIGURE 1 is an elevational view of the fence tensioning and anchoring device comprising the present invention.

Referring now more specifically to the drawings, reference numeral 10 generally denotes the fence tensioning and anchoring device comprising the present invention. The tension and anchoring device 10 comprises first of all a support section generally denoted by reference numeral 12, a stress distributing section generally denoted by reference numeral 14 attached to the support section 12 and a tension compensating section generally denoted by reference numeral 16 pivotally mounted on the stress distributing section 14.

Referring first to FIGURES 1, 2 and 4, the support section 12 will be seen to include an upright post member 18 which will be above the ground surface 20 when the device 10 is set up. Integral with and extending downwardly and at a slight forward angle with respect to the upright post member 18 is a depending supporting member 22 which, as best illustrated in FIGURE 1, will extend below the ground surface 20 when the device 10 is set up. Mounted on the foot end 24 of the supporting member 22 is a cross anchoring member 26 which, by viewing FIGURES 1 and 2 in particular will be seen to be below the surface of the ground 20 and extend transversely of the upright post member 18 and anchoring member 22 when the device 10 is set up. Another supporting member 28 joins the upper end 30 of the upright post member 18 to the foot end 24 of the anchor member 22 in order to provide increased structural rigidity to the support section 12 as well as providing a strut for transferring forces applied to the upper end 30 of the upright post 18 directly to the foot end 24 of the anchoring member 22 and to the cross anchoring member 26. The joining support member 28 includes a portion 32 which will be above the ground surface 20 when the device 10 is set up and a portion 34 which will be below the ground surface 20 when the device 10 is set up.

The stress distributing section 14 includes a framework generally denoted by reference numeral 36 which includes a plurality of strut members, the first of which is denoted by reference numeral 38 and is mounted on the short extension post 40 extending outwardly of and integrally attached to the upright post member 18. The strut member 38 and lies in the same plane as that defined by the by being welded thereto and extends at an upwardly inclined angle to the longitudinal axis of the upright post member 18, as well as lying in the plane defined by the longitudinal axes of the upright post member 18 and the joining member 28.

A pair of generally parallel arms 42 and 44 are rigidly mounted on the upright post member 18 as, for example, by being welded thereon and extend outwardly beside the joining member 28. An upright strut member 46 is rigidly fastened to the strut member 38 at its upper end and is mounted by the pin 48 between the arms 42 and 44. A leg 50 of generally rectangular configuration is rigidly attached adjacent the outermost end 52 of the strut member 38 and lies in the same plane as that defined by the strut 38, the upright post member 18 and joining member 28, and depends from the strut 38. A cross strut member 54 is mounted between the depending leg 50 and the arms 42 and 44. The cross strut member 54, as will be seen best in FIGURES 1 and 4 for example, is inclined upwardly at a greater angle than the strut member 38, and will operate to transfer forces between the depending leg 50 and the upright post member 18. Another strut member 56 which is generally parallel to the uppermost strut member 38 and includes a downturned foot portion 58 mounted by a pin 60 between the arms 42 and 44 extends outwardly thereof in the aforementioned plane and has a depending leg 62 similar to the leg 50 thereon. A final strut member 64 is mounted between the leg 62 and the arms 42 and 44 to complete the framework 36.

A pair of outstanding and parallel posts 66 and 68 are mounted at right angles to the depending legs 50 and 62, respectively. Mounted on the posts 66 and 68 and extending substantially parallel to the upright post member 18 and thus perpendicular to the ground surface 20 is a rigid upright member 70 which includes a plurality of parallel spaced apart pivot posts 72 extending at substantially right angles thereto and outwardly therefrom. The pivot posts 72 are all rigidly attached to the upright member 70 and substantially circular in cross-section.

Figure 6:
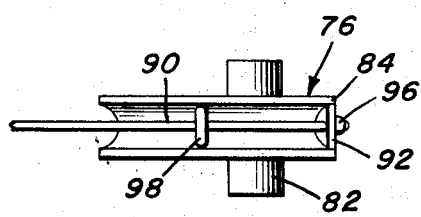
FIGURE 6 is an enlarged plan view of the pivoting head to which the various fence cables illustrated in FIGURE 1 are connected.
Figure 7:
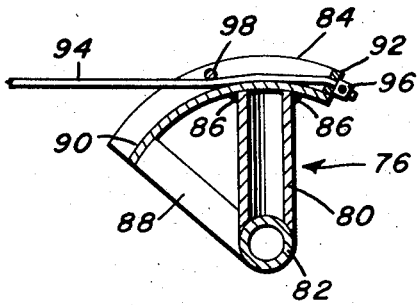
FIGURE 7 is a vertical sectional view of the pivoting head illustrated in FIGURE 6.

The tension compensating levers generally denoted by reference numeral 74 each includes a pivoting head member generally denoted by reference numeral 76 rigidly mounted on one end of a lever shaft 78 and are all mounted on the pivot posts 72. The number of pivoting heads 76 of course corresponds to the number of pivot posts 72, and the number of the same may be varied as desired, depending upon the number of cable strands utilized in the particular fence with which the device 10 is to be utilized. Referring to FIGURES 6 and 7 in particular, it will be observed that the pivot heads 76 include an upright tubular member 80 which is mounted at its lower end to a horizontally extending hollow tubular member 82 which will be mounted on the pivot post 72 for rotation thereabout. A generally curved cable mounting head portion 84 is rigidly attached to the upright tubular member 80 at the upper end thereof as, for example, by welds 86, and a supporting leg 88 joins the curved cable mounting head portion 84 and the member 82. The cable mounting head portion is half cylindrical in cross-section and includes the chamber 90 therein as well as the end wall 92 through which the fence cables 94 are mounted by suitable mounting means 96. Further, a stop pin 98 extends across the chamber 90 above the cables 94 for a purpose to be described more fully below.

Mounted to each of the parallel elongate levers 78 by means of the angle iron member 100 is a weight block 102. Thus, inasmuch as the lever members 74 are each rotatably mounted on one of the pivot posts 72, and the cables 94 are connected in the end walls 92 of the pivoting heads 76, the weight block 102 on the ends of each of the levers 78 will apply an equal and constant tension on the cables 94. Further, if an animal, in an attempt to force itself through the fence composed of the cables 94 should concentrate his weight against either a single cable 94 or several of the cables, the pivotable levers 74 and the weight block 102 will be pivoted upwardly, maintaining the tension equally on all the cables 94 all the while. Further, even if a single cable should be stressed, the levers 74 and the weight block 102 will be pivoted upwardly, and thus the resistance to the stressing force will be the same. Still further, if any one of the cables should break or elongate due to severe loadings, the balance of the fence would not be affected. Also, when the force on the cables 94 is excessive, this condition would normally cause the weight block to be moved upwardly to a point wherein tension would no longer be applied to the cables 94 (that is a point wherein no vertical component of force would be effective). This possible condition is effectively prohibited by means of the pins 98 which limit the upward pivoting movement of the pivoting levers 74 and weight block 102.

In order to provide additional support for the outboard end of the stress distributing section 14, an inverted U-shaped supporting member generally denoted by reference numeral 104 is provided. The supporting member 104 includes a pair of upstanding legs 106 and 108 each of which has a foot 110 at the bottom end thereof, the feet 110 normally being buried below the surface of the ground 20 in order to be sturdily mounted in substantially rigid vertical position. An integral cross member 112 extends between the legs 106 and 108 at the upper end of the supporting member 104, and includes a depending elongate support 114 having a threaded portion 116 received in the cross member and a head portion 118 to which a pair of upstanding ears 120 and 122 on the strut 38 may be fastened in order to support the stress distributing section.

It will be readily appreciated, of course, that the stress distributing section 14 will act to distribute the tension or stress forces from the cables 94 as follows: the stress on the cables is imparted directly to the pivot post 72 through the pivoting heads 76, and thence to the depending legs 60 and 62. The stress forces will at this time normally place the struts 38 and 56 in compression and the struts 54 and 64 in tension due to the upward inclination thereof. Since the struts 38, 54, 56 and 64 are all ultimately secured to the upright post member 18, the upright post member 18 will be stressed as the force is distributed therealong, and since the anchoring leg 22 is integral with the upright post member 18 at its upper end and has the anchoring member 26 at its lower end, the entire load will ultimately be applied to the anchoring member 26. Inasmuch as it is essential in maintaining the correct distribution of the forces on the stress distributing section 14, the function of the supporting member 104 is to hold the section 14 at the proper inclination level. It will be appreciated, of course, that the cross anchoring member 26 will be quite difficult to be pulled out of the ground and hence the entire device will be quite stable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fence tensioning and anchoring device for flexible fencing members comprising, in combination, an upstanding support, means for anchoring said support to the ground, a stress distributing assembly mounted on said support, a cable tensioning assembly, means for pivotally mounting said cable tensioning assembly on said stress distributing assembly, said cable tensioning assembly including means thereon for receiving said flexible fencing members, and means for applying equal and constant tension to said flexible fencing members, said stress distributing assembly including at least one horizontally disposed pivot post thereon, said cable tensioning assembly comprising at least one lever member mounted on said pivot post for rotation thereon, means for connecting a flexible fencing member to said one end of said lever member at a point offset from said pivot post whereby rotation of said lever member will be caused when said flexible fencing member is stressed, and weight block means on the other end of said lever member for tensioning said flexible fencing member, said connecting means comprising a substantially arcuate member mounted on said lever member, said arcuate member being substantially semi-cylindrical in cross-section and including chamber means therein, said arcuate member having wall means at one end thereof, means for fastening said flexible fencing member to said wall means with said flexible fencing member lying at least partially in said chamber means whereby stress forces on said flexible fencing member will cause said arcuate member to rotate thereby causing said lever member and weight block to rotate also.

2. The combination of claim 1 including means in said arcuate member for limiting the rotation thereof in response to said forces on said flexible fencing member.

3. A fence tensioning device for flexible fencing members comprising, an upstanding support, a tensioning assembly for tensioning said flexible fencing members rotatably mounted on said support, said tensioning assembly including a plurality of arcuate members, each said arcuate member having means therein for receiving one of said flexible fencing members, means at the center of curvature of each said arcuate member for rotatably mounting said arcuate members on said support, each said arcuate member having lever means extending therefrom, and weight means connected to the ends of each said lever means for tensioning said flexible fencing means, said lever means being an elongated member lying in a plane common to all associated elongated members.

4. The combination of claim 2 wherein said anchoring means comprises at least one substantially vertical anchoring member attached to said upstanding support and adapted to be sunk into the ground, and a cross anchoring member fixed to the lower end of said substantially vertical anchoring member, said cross anchoring member extending transversely of the longitudinal axis of said upstanding support so as to resist forces introduced into said upstanding support.

5. The combination of claim 4 wherein said stress distributing assembly includes a plurality of strut members mounted at one end on said upstanding support, means for joining the other end of said strut members, said aforementioned post attached to said joining means whereby stress forces imparted to one or more of said flexible fencing members will be transferred to said upstanding support, and means for adjusting the vertical position of said joining means with respect to the ground.

References Cited

UNITED STATES PATENTS

| | | | |
|---|---|---|---|
| 21,459 | 9/1858 | Williams | 256—38 |
| 588,002 | 8/1897 | Parker | 256—39 |
| 605,496 | 6/1898 | Manning | 256—38 |
| 670,661 | 3/1901 | Boger | 256—38 |
| 1,303,486 | 5/1919 | Locke | 49—396 |

DAVID J. WILLIAMOWSKY, *Primary Examiner.*

DENNIS L. TAYLOR, *Examiner.*